US009961090B2

(12) United States Patent
D'Aveta et al.

(10) Patent No.: US 9,961,090 B2
(45) Date of Patent: May 1, 2018

(54) MESSAGE QUARANTINE (71) Applicant: Bank of America Corporation, Charlotte, NC (US)

(72) Inventors: Robert Nicholas D'Aveta, Huntersville, NC (US); David John Wesley Gruver, Frisco, TX (US); Kenneth Aaron Kaye, Rockville, MD (US); Ronald Fong, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days. days.

(21) Appl. No.: 14/743,325

(22) Filed: Jun. 18, 2015

(65) Prior Publication Data

US 2016/0373466 A1    Dec. 22, 2016

(51) Int. Cl.
*H04L 29/06*    (2006.01)
*G06F 21/55*    (2013.01)

(52) U.S. Cl.
CPC ........ H04L 63/1408 (2013.01); G06F 21/554 (2013.01); H04L 63/145 (2013.01)

(58) Field of Classification Search
CPC .................................................. H04L 63/1416
See application file for complete search history.

(56) References Cited

U.S. PATENT DOCUMENTS

| | | | |
|---|---|---|---|
| 7,299,361 B1 * | 11/2007 | Kim ........................ | G06F 21/56 713/188 |
| 7,451,487 B2 | 11/2008 | Oliver et al. | |
| 7,580,982 B2 | 8/2009 | Owen et al. | |
| 7,712,136 B2 * | 5/2010 | Sprosts ................ | G06Q 10/107 726/24 |
| 7,748,038 B2 * | 6/2010 | Olivier .................. | H04L 63/145 726/24 |
| 8,074,280 B2 | 12/2011 | Fossen et al. | |
| 8,347,398 B1 | 1/2013 | Weber | |
| 8,443,441 B2 * | 5/2013 | Stolfo ..................... | H04L 51/12 709/206 |
| 8,549,611 B2 | 10/2013 | Judge et al. | |
| 8,566,928 B2 | 10/2013 | Dagon et al. | |

(Continued)

FOREIGN PATENT DOCUMENTS

EP      2661852 A1    11/2013
JP    2009512082 A     3/2009

*Primary Examiner* — Kambiz Zand
*Assistant Examiner* — Thanh Le
(74) *Attorney, Agent, or Firm* — Banner & Witcoff, Ltd.; Michael A. Spring (57) ABSTRACT Systems, methods, apparatuses, and computer-readable media configured to receive a search query and identify one or more messages matching at least a portion of the search query are provided. The identified one or more messages may be displayed, in some examples, and user input may be received identified at least one message of the identified one or more messages for further processing, such as quarantine. In some examples, the at least one message may be transmitted to an account search server which may search a plurality of user accounts, such as email accounts. The account search server may identify one or more occurrences of the at least one message in one or more accounts of the plurality of accounts and may remove the occurrence of the at least one message from the account and transfer the at least one message to a quarantine location.

20 Claims, 9 Drawing Sheets

(56) References Cited

U.S. PATENT DOCUMENTS

| | | |
|---|---|---|
| 8,578,497 B2 | 11/2013 | Antonakakis et al. |
| 8,595,303 B2 | 11/2013 | Plotts et al. |
| 8,621,614 B2 | 12/2013 | Vaithilingam et al. |
| 8,631,489 B2 | 1/2014 | Antonakakis et al. |
| 8,719,924 B1 | 5/2014 | Williamson et al. |
| 8,850,571 B2 | 9/2014 | Staniford et al. |
| 8,984,289 B2 | 3/2015 | Oliver et al. |
| 8,990,944 B1 | 3/2015 | Singh et al. |
| 2007/0294765 A1* | 12/2007 | Rihn ................ G06F 21/56 726/22 |

* cited by examiner

MESSAGE QUARANTINE

BACKGROUND

Entities, in particular large entities having several hundred or thousand employees, receive countless emails in any given day. While these emails often make conducting business simpler and more efficient, they also pose a threat. That is, a portion of these emails may contain malicious content (e.g., links or attachments) that may pose a threat to the entity (e.g., computer viruses, or the like). Accordingly, identifying potentially malicious emails is an important function in any entity. However, the sheer volume of emails to consider and evaluate also makes this task, when performed using conventional systems, slow, inefficient, and leaves the entity prone to risk from the potentially malicious emails.

SUMMARY

Aspects of the disclosure relate to various systems, methods, apparatuses, and computer-readable media configured to receive a search query and identify one or more messages matching at least a portion of the search query. The identified one or more messages may be displayed, in some examples, and user input may be received identified at least one message of the identified one or more messages for further processing, such as quarantine.

In some examples, the at least one message may be transmitted to an account search server which may search a plurality of user accounts, such as email accounts. The account search server may identify one or more occurrences of the at least one message in one or more accounts of the plurality of accounts and may remove the occurrence of the at least one message from the account and transfer the at least one message to a quarantine location. A status of the occurrence may be transmitted and/or displayed to a user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of this disclosure relate to identifying potentially malicious messages, such as email messages, that have been received by one or more user accounts. A potentially malicious message may include an attachment or link that may contain damaging content (e.g., damaging to a computer system). Accordingly, prompt removal of the potentially malicious message from the system may reduce or eliminate risk associated with the malicious content.

In some examples, a query or other search criteria may be provided. Received messages matching at least a portion of the query or search criteria may be identified and displayed to a user. A user may select one or more messages or sets of message identification criteria for further processing and the selected messages, or metadata may be transmitted to a search module or device. The search module or device may search a plurality of user accounts to identify occurrences of the selected message(s). Any occurrences may be removed from the user account and the message may be transferred to a quarantine location. The status of the occurrence may be noted and transmitted to a user. These and other features will be described more fully below.

Figure 1:
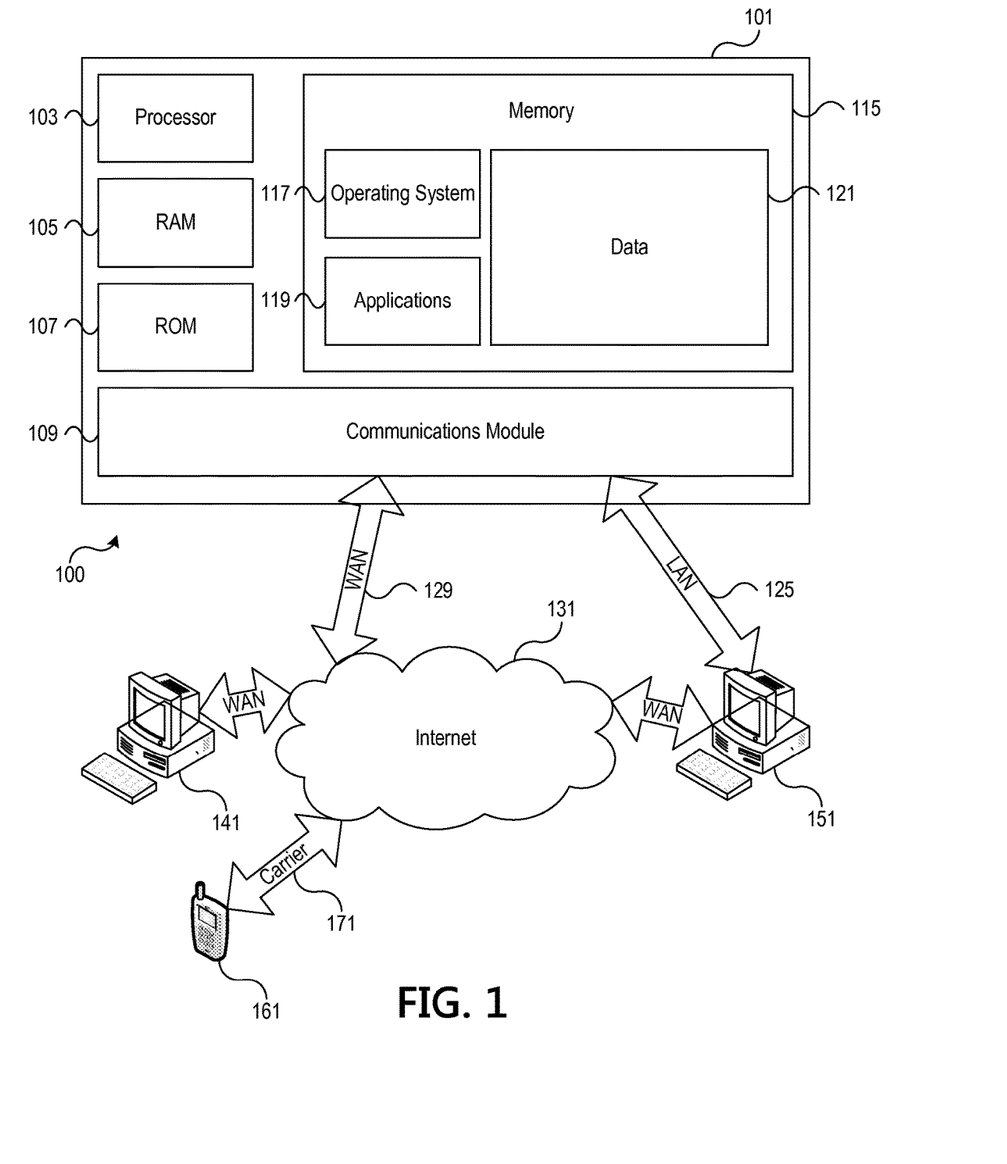
FIG. 1 depicts an illustrative operating environment in which various aspects of the disclosure may be implemented in accordance with one or more aspects discussed herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like. In some examples, these known computing systems may be configured (e.g., with particular hardware, software, or combinations thereof) to perform the functions described herein. For instance, general purpose computing devices may be configured with particular hardware and/or software to perform the functions described herein (e.g., identifying a potentially malicious message, evaluating user accounts to identify instances of the potentially malicious message, quarantining the potentially malicious message, and the like). In other examples, the computing device may be a special purpose computing device having particular components that are configured to perform the functions described herein.

Figure 2:
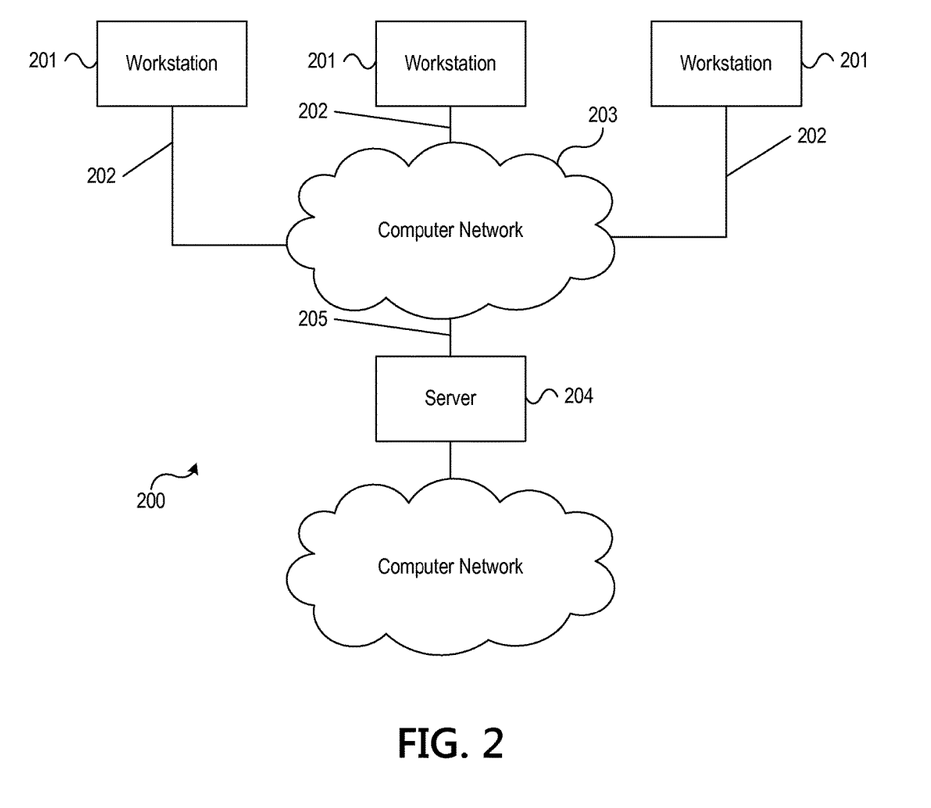
FIG. 2 depicts an illustrative block diagram of workstations and servers that may be used to implement the processes and functions of certain aspects of the present disclosure in accordance with one or more aspects discussed herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like, that is configured to perform the particular functions described herein. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
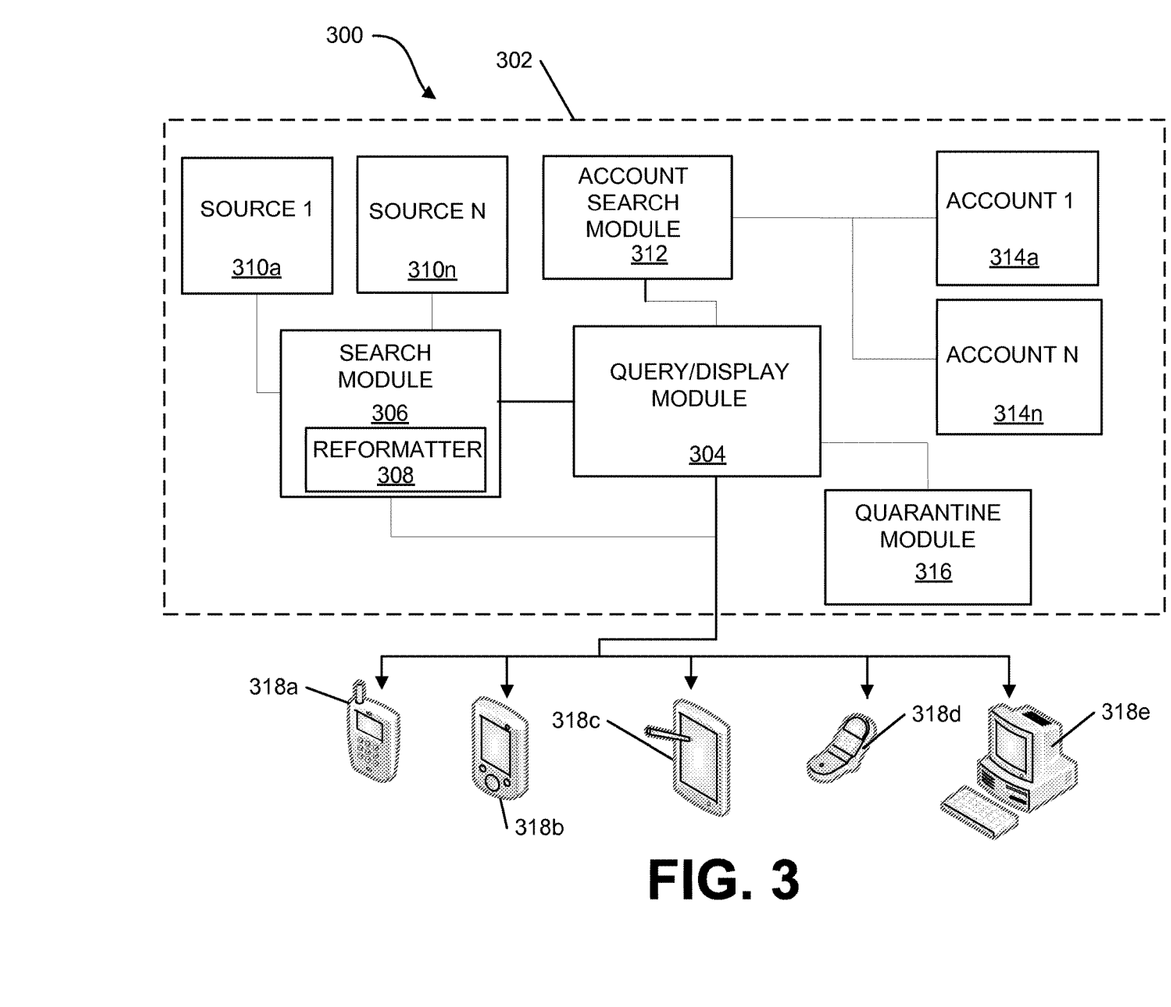
FIG. 3 illustrates one message quarantine system in accordance with one or more aspects discussed herein.

FIG. 3 illustrates one example message quarantine system 300. In some examples, the message quarantine system 300 may be part of, internal to, or associated with an entity 302. The entity 302 may be a corporation, university, government entity, or the like. In some examples, the entity 302 may be a financial institution, such as a bank. Although various aspects of the disclosure may be described in the context of a financial institution, nothing in the disclosure shall be construed as limiting the message quarantine system 300 to use within a financial institution. Rather the system may be implemented by various other types of entities.

Further, aspects of the message quarantine system 300 may be contained in one or more computing devices, servers, or the like configured to perform the particular functions described herein. For instance, the message quarantine system 300 may include one or more modules, devices, systems, or the like, that may be implemented in hardware and/or software configured to perform various functions (e.g., functions particular to the message quarantine system 300) within the system 300. One or more modules may be contained within the same physical device or may be housed in separate devices. Further, although one or more modules shown in FIG. 3 are within the entity 302, any of the modules may be located external to the entity 302 but may be associated with the entity 302. For instance, one or more modules may be associated with a personal computing device of a user. Accordingly, various functionality associated with the modules may be performed at the personal computing device, which may be located external the entity 302 but may be associated with the entity by way of a user associated with the device being associated with the entity 302 (e.g., a customer of the entity, an employee of the entity, or the like), the device including or running an application of the entity 302, and the like. Nothing in the disclosure should be viewed as limiting the one or more modules to a same physical location or a location within an entity.

Message quarantine system 300 may include a query/display module 304. The query/display module 304 may include hardware and/or software configured to perform various functions within the message quarantine system 300. For instance, the query/display module 304 may include hardware and/or software configured to receive a query or search criteria, display search results, receive user input (e.g., via a graphical user interface) to select one or more items from the search results, and monitor a status of one or more potentially malicious messages. For instance, a user may input (e.g., via a graphical user interface) one or more search criteria. The search criteria may include identification of a potentially malicious message, such as an email message. The identification information may include a sender name, a recipient name, a subject line, a keyword, or the like. Combinations of these items may also be used to identify the potentially malicious message.

In another example, the query/display module 304 may receive search criteria and/or a query via a file upload. The query/display module 304 may receive user input identifying one or more files that may be used to identify potentially malicious messages, as will be discussed more fully below.

In yet another example, the query/display module 304 may receive one or more search criteria from a user (e.g., forming a customized search). The search criteria may include a recipient name, sender name, sender email address, recipient email address, subject line information, keyword, or the line. Any combination of one or more of these criteria may be used. A user may input the search criteria into, for instance, a graphical user interface displayed on query/display module 304. The input may be received from one or more computing devices, such as a smart phone 318a, personal digital assistant (PDA) 318b, tablet computing device 318c, cell phone 318d, or other type of computing device 318e.

The message quarantine system 304 may further include a search module 306. The search module may include hardware and/or software configured to perform particular functions within the message quarantine system 300. For instance, the search module 306 may include hardware and/or software configured to search various accounts, systems, or the like, to identify one or more messages matching the received search criteria. In some examples, the search module 306 may search through a plurality of received messages (e.g., email messages received by a recipient at the entity) to determine whether any of the messages match the search criteria input to the query/display module 304.

In arrangements in which the query or search criteria include identification of a single messages (e.g., via user input identifying one or more of a sender, recipient, subject, or the like) the search module may search through received messages to determine whether any of the messages match the search criteria of the identified single message.

In examples in which a file upload is indicated as the search criteria/query, files may be received from one or more sources, such as Source 1 310 through Source N 310n. Any number of sources may provide data to the search module 306 for review. In some examples, the sources may provide data to the search module 306 that is not formatted for searching by the search module 306. In such examples, a reformatter module 308 may be used to reformat any data to enable searching by the search module 306.

In some arrangements, the files uploaded to the search module 306 may include identification of one or more potentially malicious messages. In some arrangements, the files may be comma-separated value (CSV) files identifying one or more potentially malicious messages by one or more of recipient, sender, subject, keyword, or the like.

In still other arrangements, the search module 306 may search received messages based on search criteria input to the query/display module 304. As indicated above, the search criteria may include one or more of sender, recipient, subject, keyword, or the like. The search module 306 may then, via a log repository, search a plurality of received messages to identify one or more messages matching one or more of the search criteria. In some examples, the search module 306 may use grouping logic to search for messages matching the search criteria or query.

Results of the search performed by the search module 306 may be transmitted to the query/display module 304 for display on, for instance, a graphical user interface. A user may then select (e.g., via one or more of computing devices 318a-318e) one or more of the identified messages that should be quarantined. In some arrangements, the query/display module 304 and search module 306, as well as various other components of the system 300, may be embodied in a message identifying server. The message identifying server may include one or more computing devices, components of computing devices, and the like and may include at least a first processor, a first communication interface and a first memory storing computer-executable instructions that, when executed, cause the at least a first processor to perform various functions as described herein.

The selected messages (or metadata) may be transmitted to an account search module 312. In some examples, the account search module 312 may also receive identification of one or more accounts to search for the identified messages. For instance, the system may identify one or more accounts, such as Account 1 314*a* through Account N 314*n* in which the system should search to determine whether the one or more identified messages have been received by those accounts. The accounts may be user email accounts (e.g., an email account for each employee of the entity 302). The account search module 312 may then search the identified accounts (or, in some examples, all accounts) for instances of the identified messages. If any instances of the identified messages are found, the account search module 312 may automatically remove the instance of the identified message and transmit or transfer the message to quarantine module 316. Accordingly, the potentially malicious message may be removed from the user account and placed into quarantine in the quarantine module 316 to await further processing, analysis, or the like.

In some examples, the account search module 312 or the quarantine module 316 may transmit a status of a message to, for instance, the query/display module 304. The status may indicate whether an identified messages was found in any of the accounts searched, identification of an account in which an identified email was found, an indication of whether any instances of the identified message were transferred to the quarantine module 316, and the like. This information may be displayed, via a graphical user interface, to a user via the query/display module 304.

In some examples, the account search module 312, quarantine module 316, and/or various other components of the system 300 may be embodied in an account searching server. The account searching server may include one more computing devices and/or components thereof, including at least a second processor, a second communication interface and a second memory storing computer-executable instructions that, when executed, cause the at least a second processor to perform various functions described herein.

These and other arrangements will be discussed more fully below.

Figure 4A:
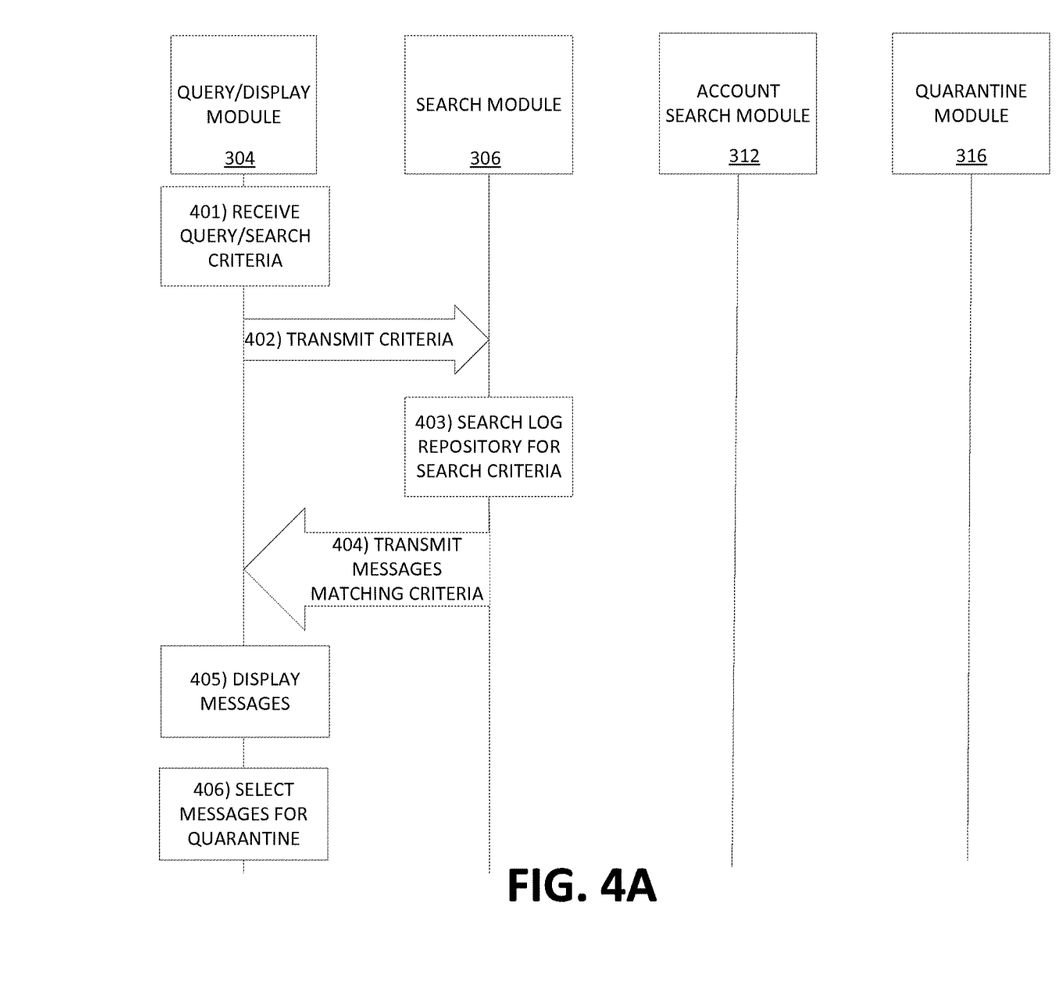
FIGS. 4A and 4B illustrate one example event sequence for identifying potential malicious messages and removing them from a user account in accordance with one or more aspects described herein.
Figure 4B:
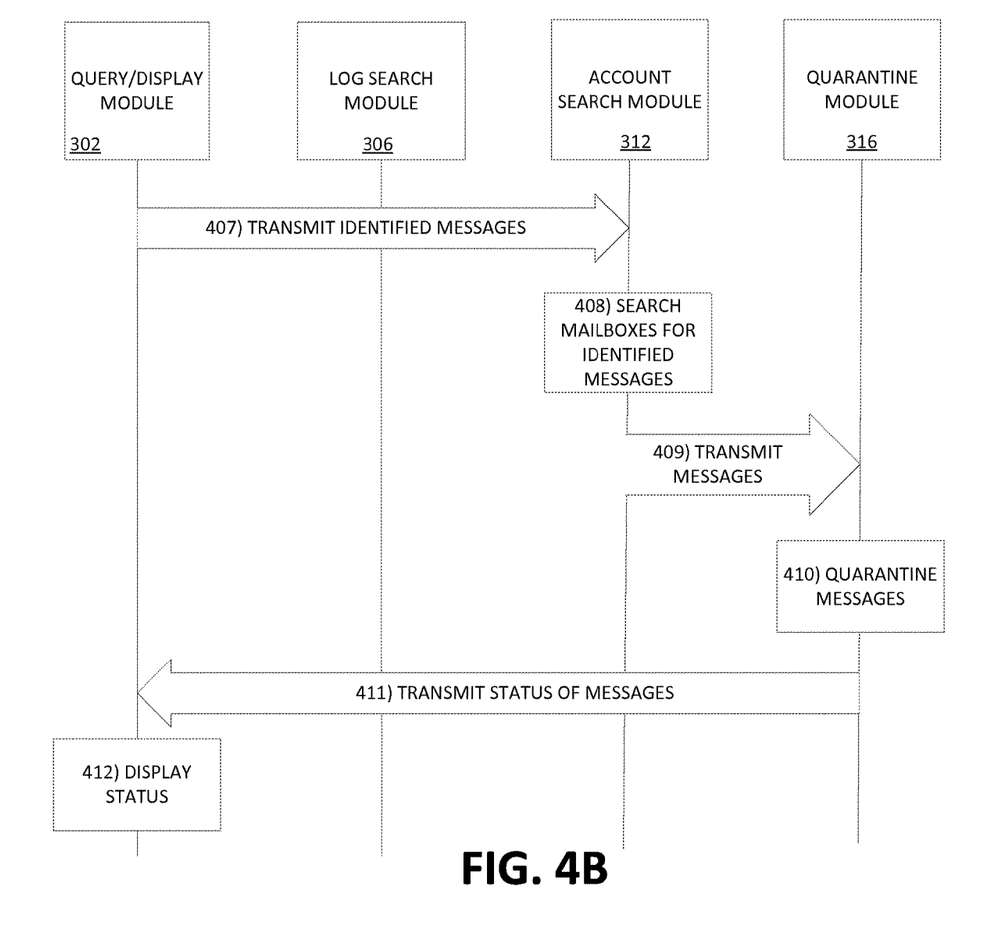

FIGS. 4A and 4B illustrate one example event sequence for identifying messages for quarantine, identifying occurrences of those messages and quarantining the messages. The example shown in FIGS. 4A and 4B is merely one example sequence and various other steps, processes, or the like, may be included in this or other example sequences without departing from the invention.

With reference to FIG. 4A, in step 401, a query and/or search criteria are received, such as by a query/display module 304. The query/display module 304 may include some or all of the components described with respect to computing device 101 in FIG. 1, and may be configured to receive user input (e.g., via a user interface), display data (e.g., via the same or a different user interface), and the like.

The query and/or search criteria may be received in one or more ways. For instance, a user may identify a single message that may be considered malicious or potentially malicious. This single message may be identified by sender, recipient, keyword, subject line or portion thereof, size, or the like. Any combinations of those potential identifiers may also be used to identify the single message.

In another example, a file upload may be used to identify one or more malicious or potentially malicious messages. For instance, a file (such as, for example, a comma-separated value (CSV) file) including data from one or more sources (such as Source 1 310*a* through Source N 310*n*) may be uploaded and the data identified in the file (e.g., one or more messages within the file) may be used as the query or search criteria. Similar to the single message arrangement, data to be used may include sender, recipient, subject line or portion thereof, size, keyword, or the like. Combinations of those identifiers may also be used.

In yet another example, the system may search through a plurality of delivered messages based on user-defined search criteria via a log repository. For instance, a user may input (via, for example, a user interface on query display module 302) a name of a sender, a recipient, subject line, or the like. The system may then use grouping logic to search through received messages to identify any messages matching the criteria provided.

Once the search criteria and/or query is provided in step 401, the system may transmit the query and/or search criteria to a search module 306. The search module 306 may then search the received messages (e.g., received email messages in one or more accounts) to identify one or more messages matching the criteria provided to the system. This searching process may be performed in step 403 and, in step 404, identifying metadata about the messages or messages matching the search criteria may be transmitted to the query/display module 304 for display and/or selection. For instance, messages or metadata about one or more messages identified as matching the search criteria may be transmitted to the display module 304 and displayed in step 405. Accordingly, a user (e.g., administrator, information technology expert, or the like) may review the identified messages or metadata to identify any messages that should be quarantined. In some arrangements, the identified matching messages or metadata may be displayed, e.g., in a list, on the display module 304. Each message may include a radio button or other selection option such that the user may review the listing of messages and select messages for quarantine and/or remove messages that are deemed safe or do not require further processing, quarantine, or the like.

Accordingly, in step 406, one or more of the identified messages may be selected for quarantine. In step 407, the identified messages or metadata may be transmitted to, for example, an account search module 312. In step 408, the account search module may then search through a plurality of user accounts to determine occurrences or instances of the identified message(s) being received by those accounts. In some examples, the one or more accounts to be searched may be identified to the account search module 312. In other examples, the account search module 312 may search all available accounts (e.g., user email accounts).

In step 409, any occurrences of the identified message(s) found in the search performed by the account search module 312 may be removed from the user account (e.g., the message may be deleted or removed from the user's email account) and may be transmitted to a quarantine module 316. In step 410, the message(s) may be quarantined to await deletion, removal, further processing or evaluation, or the like. A status of the message(s) may be transmitted to the query/display module 304 in step 411 and the status may be displayed, via a graphical user interface, in step 412.

Figure 5:
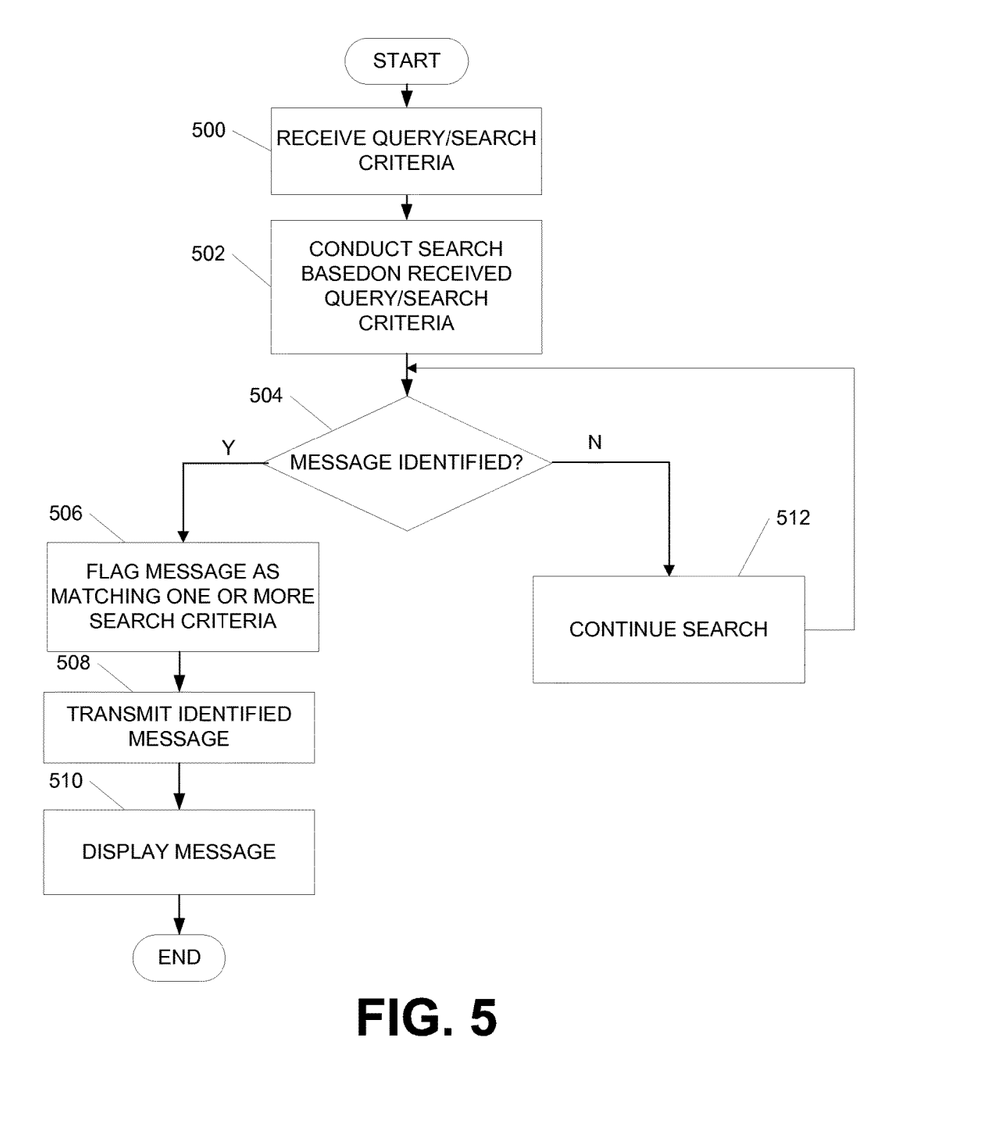
FIG. 5 illustrates one example method of identifying and searching for potentially malicious messages according to one aspects discussed herein.

FIG. 5 illustrates one example method of identifying and searching for potentially malicious messages according to one or more aspects described herein. In step 500, a query and/or search criteria may be received. The query and/or search criteria may be received via one or more of the arrangements described above (e.g., with respect to FIGS. 3 and 4). In step 502, the system (e.g., a search module such as search module 304 in FIG. 3) may search received messages (such as email messages) to identify messages matching the query or one or more of the search criteria. In step 504, a determination is made as to whether a message has been identified as matching the query or the one or more search criteria. If not, the system will continue searching received message in step 512 (e.g., on a periodic or aperiodic basis).

If, in step 504, the system does identify a message, the message may be flagged as a match and as being potentially malicious in step 506. In some examples, the search process will continue at step 502 until all potential matches have been identified. In step 508, the message or identifying metadata for the message (and any other messages identified/flagged) may be transmitted for display and/or selection (e.g., to a query display module 304). In step 510, any messages matching the query and/or one or more search criteria may be displayed to a user for selection and/or further processing or evaluation.

Figure 6:
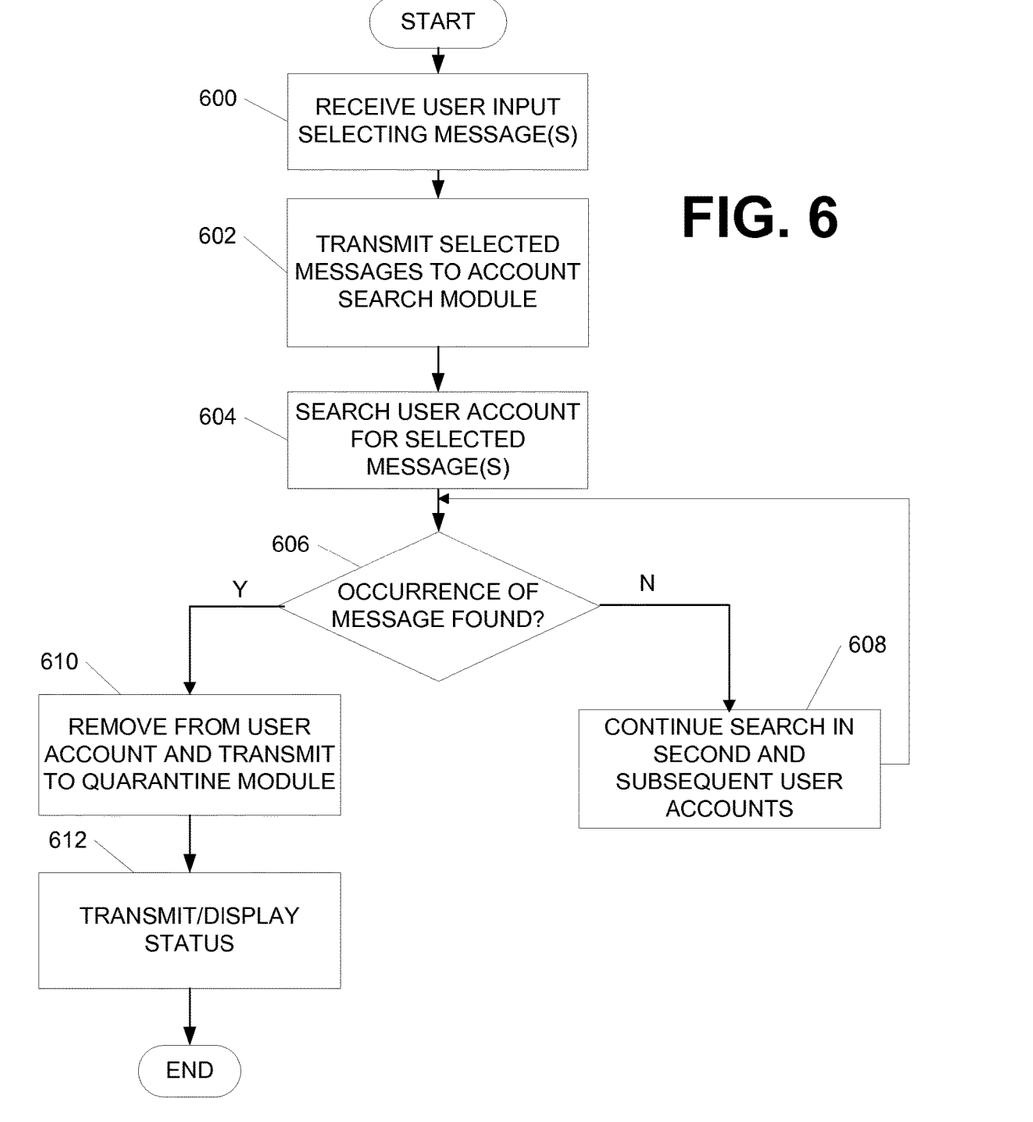
FIG. 6 illustrates one example method of identifying occurrences of an identified potentially malicious message and quarantining the message according to one or more aspects discussed herein.

FIG. 6 illustrates one example method of identifying occurrences of an identified potentially malicious message and quarantining the message according to one or more aspects described herein. In step 600, user input is received selecting messages for quarantine. For instance, a user may select one or more messages identified as potentially malicious (e.g., identified and flagged in FIG. 5) from a display of such messages. Accordingly, although the system may identify a plurality of messages as potentially malicious, in some examples, a user may indicate which message require quarantine and/or additional processing. Thus, some messages may be deemed safe and might not be further processed, thereby saving time, making the process more efficient and reducing errors. In other arrangements, the system may automatically select some or all of the messages identified and flagged from the process in FIG. 5).

In step 602, the selected messages or identifying metadata about the selected messages may be transmitted to an account search module (e.g., account search module 312 in FIG. 3). In step 604, the system may search one or more user accounts (e.g., email accounts of users, such as employees of the entity) to identify occurrences of the identified message(s). In step 606, a determination is made as to whether an account includes an occurrence of the selected message(s). If not, the system may continue searching a second or other subsequent account in step 608.

If, in step 606, an occurrence of a message is found in a user account, the message may be removed from the user account and transmitted to a quarantine module in step 610. In some examples, the search process will continue at step 604 until all potential matches have been identified. The status of the message may be transmitted and/or displayed to a user in step 612. The status may include an indication that the message was transmitted to the quarantine module, the account from which the message was removed, and the like.

Figure 7:
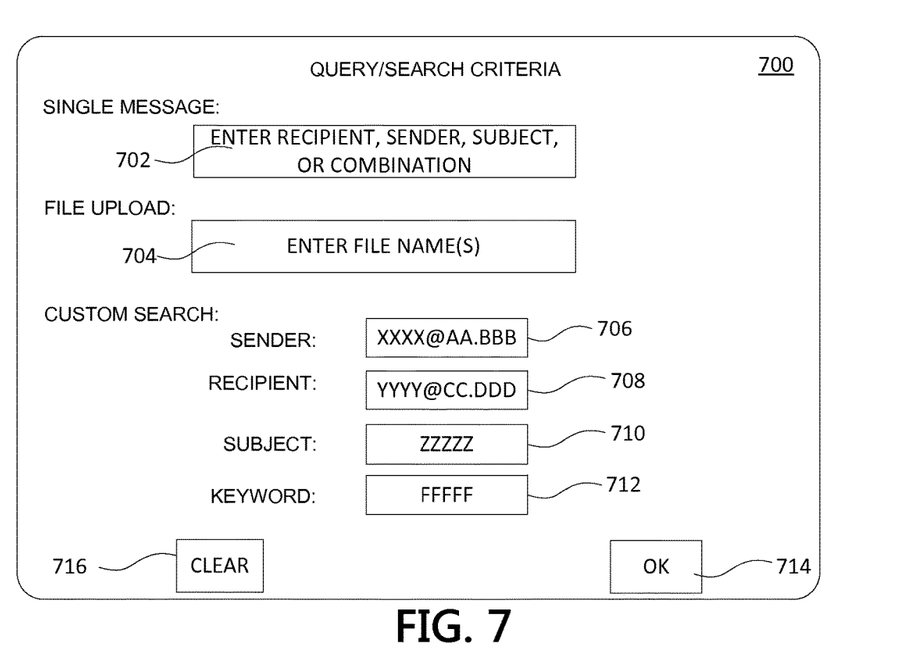
FIG. 7 illustrates one example user interface for providing a query and/or search criteria to the system according to one or more aspects discussed herein.

FIG. 7 illustrates one example user interface for providing a query and/or search criteria. The user interface 700 may be displayed, for example, via query/display module 304, and may receive user input from one or more computing devices, such as devices 318a-318e. The interface 700 includes various different methods of inputting a query or search criteria. Although multiple different methods are shown in a single user interface in FIG. 7, in some arrangements, separate or additional user interfaces may be used for each different method of inputting the query and/or search criteria.

Interface 700 includes field 702 in which a single message may be identified for searching. The single message may be identified as indicated herein, such as by recipient, sender, subject line, or combinations thereof.

The interface 700 further includes field 704 in which a file upload may be used to identify potentially malicious emails. A user may insert in field 704 one or more file name(s) containing data to be used to search the messages.

Further, interface 700 includes a custom search region in which a user may provide one or more customized search criteria. For instance, a user may enter a sender name or email address in field 706, a recipient name or email address in field 708, a subject line in field 710 and/or a keyword in field 712. Combinations of these items may be provided by a user for searching, as well as different categories of search criteria may be used. The system is not limited to only the criteria shown in FIG. 7. Further, a user may input multiple entries into each field. For instance, multiple sender names or email addressed may be input in field 706 to search for multiple potentially malicious senders/messages in one search. Accordingly, this will greatly reduce the time to search for potentially malicious messages, which may reduce potential damage caused by the messages, and greatly increase efficiency.

If the desired query or search criteria are input, a user may select "OK" option 714 to process the search. Alternatively, the user may select "CLEAR" option 716 to remove any information input into the interface 700.

Figure 8:
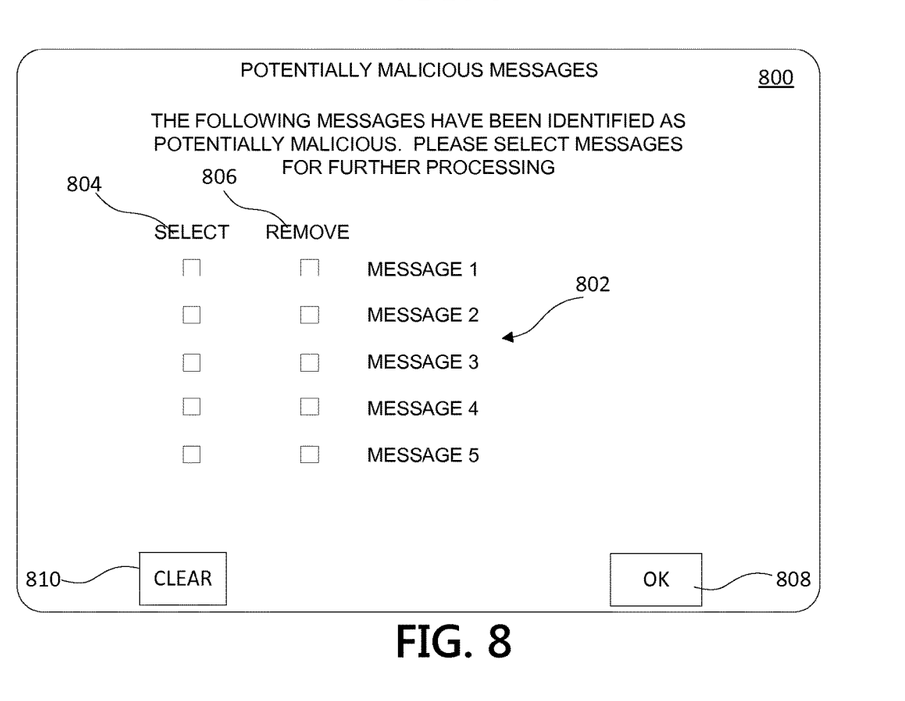
FIG. 8 illustrates one example user interface for selecting potentially malicious messages for quarantine according to one or more aspects described herein.

FIG. 8 illustrates one example user interface for selecting potentially malicious messages for quarantine, according to one or more aspects described herein. Interface 800 includes region 802 in which messages or identifying metadata about messages matching the query or search criteria may be displayed. In some arrangements, the system may automatically search one or more user accounts for these messages and automatically remove them from the user account and transmit them to the quarantine module. In other examples, a list of identified messages or metadata for a list of identified messages may be displayed (e.g., via an interface such as interface 800) and a user may select one or more messages for further processing, quarantine, or the like.

For instance, a user may select one or more of the displayed messages by selecting, for example, a check box associated with that email. Various other methods of selection (such as a radio button, clicking or double-clicking the desired message and highlighting the message to indicate selection, or the like) may be used without departing from the invention. In the example shown in FIG. 8, a user may select a check box from the "select" column 804 for messages that should be further processed. For instance, further processing may include transmitting the metadata concerning the selected messages to an account search module, searching a plurality of user accounts to identify occurrences of the selected message(s) and/or quarantining occurrences of the message(s), as discussed herein. A user may select multiple messages by selecting multiple check boxes in the column 804. Accordingly, in some arrangements, the system may search for all selected messages simultaneously, thereby improving efficiency and reducing the time required to identify occurrences of a plurality of messages.

If a user does not wish to further process a message, the user may select the check box in "remove" column 806. For example, a user may recognize a sender of an email, or recognize an email by another identifier and may deem that message to be safe or not malicious. Accordingly, the user might not wish to have the message quarantined and, accordingly, may remove the identified message from the list of identified messages.

Once all desired selections have been made, a user may select "OK" option 808 to process the selections (e.g., remove the messages identified for removal and further process the messages selected). Alternatively, a user may select "CLEAR" option 810 to remove all selections made.

Figure 9:
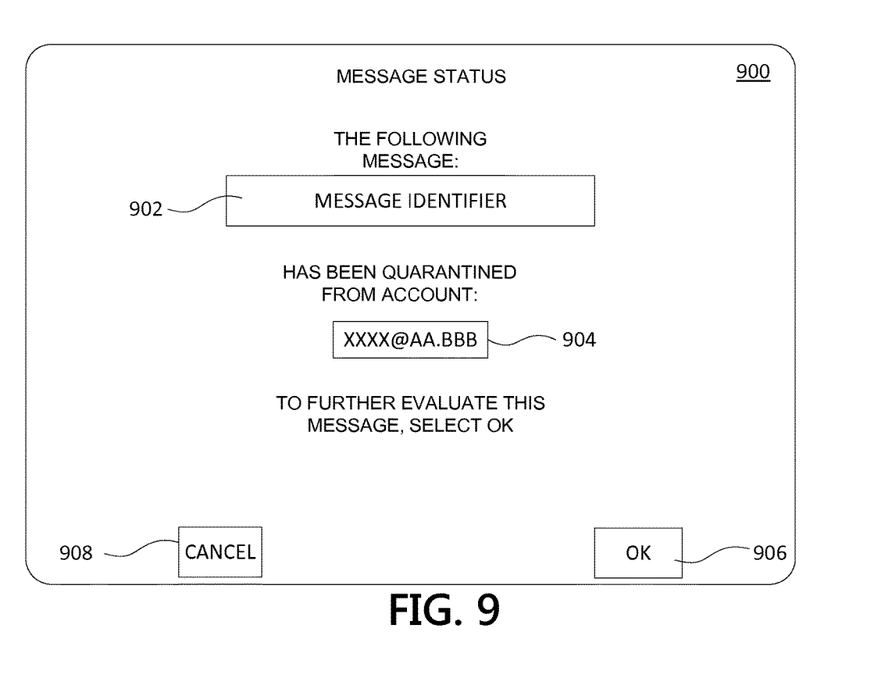
FIG. 9 illustrates one example user interface for providing a status of a message that has been quarantined according to one or more aspects described herein.

FIG. 9 illustrates one example user interface 900 providing a status of a message for display (e.g., via a query/display module 304). The interface includes region 902 in which the message that was quarantined is identified. The message may be identified by sender, recipient, subject, or the like, or any combinations thereof. The interface further includes field 904 in which an account from which the message was removed may be displayed. In some examples, a message may be removed from multiple accounts and, accordingly, multiple accounts may be displayed in field 904.

The interface 900 gives a user an option to obtain more information or further evaluate the quarantined message by selecting "OK" option 906. Alternatively, the user may select "CANCEL" option 908 to return to a previous interface or other display.

One example implementation of the systems and arrangements described herein is provided below. The example provided below is intended to be merely one example and is not intended to limit the scope of the arrangements described herein.

In one example, Company A receives approximately 10 million emails per day. A small percentage of these emails may contain malicious content. Accordingly, the systems and arrangements described herein may be used to quickly identify any potentially malicious emails and promptly remove them from user accounts and quarantine the messages. For instance, a user (e.g., a system administrator or the like) may be aware of an email that is circulating that includes a malicious content in the form of an attachment. The content is being distributed from a sender email address of aaaaa@bb.ccc. Accordingly, the administrator may access a user interface (such as interface 700 in FIG. 7) to search for any emails received from this sender. The user may input the sender email address and may then search for all emails or messages received from this sender.

The system, as described herein, may search messages via a log repository. Any messages matching the search criteria (e.g., received from the identified sender email address) may be identified and the messages or the identifying metadata displayed to the user. The user may then review the identified messages or messages' metadata and may identify one or more messages that may be malicious. For instance, if ten email messages are identified and only five include attachments (and, in this example, the malicious content is in the form of an attachment) the five identified messages including the attachments may be selected for further processing while the other five may be removed from the process.

The five selected messages or messages' identifying metadata may be transmitted to an account search module. The account search module may search a plurality of user accounts (e.g., user email accounts) to identify occurrences of any of the five selected emails. These occurrences may be removed from their respective user accounts and transmitted to a quarantine location to await further evaluation or destruction. The status of any occurrences may be displayed to the user. The status may include the sender, recipient and subject of the quarantined email, the user account from which it was removed, a date, time, or the like, that the occurrence was removed and/or quarantined, and the like. This information may be stored and reviewed as desired.

As indicated from the above example and description provided herein, the system and arrangements described herein provide an efficient manner of identifying potentially malicious messages, identifying occurrences of those messages, removing the occurrences from a user account and quarantining the potentially malicious messages. The ability to generate a customized search which may efficiently identify malicious messages may improve the speed at which the messages may be removed from the system, thereby reducing the risk associated with receipt of a malicious message. In some examples, the systems and arrangements described herein may provide a 150% efficiency improvement over conventional systems for a single message and the ability to act upon multiple messages simultaneously may result in much larger efficiency improvements for larger sets of messages. This efficiency improvement may be significant when prompt removal of the malicious content is critical to the safety and/or security of the system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the modules discussed above may be combined into a device, and the various functions of each module may be performed by the single computing device. In such arrangements, any and/or all of the above-discussed communications between modules may correspond to data being accessed, moved, modified, updated, and/or otherwise used by the single computing device. Additionally or alternatively, one or more of the modules discussed above may be implemented in one or more virtual machines that are provided by one or more physical computing devices. In such arrangements, the various functions of each module may be performed by the one or more virtual machines, and any and/or all of the above-discussed communications between modules may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
a message identifying server including at least a first processor, a first communication interface and a first memory storing computer-executable instructions that, when executed, cause the at least a first processor to:
receive a search query;
search a plurality of received messages to identify one or more messages matching at least a portion of the search query;
display the identified one or more messages matching the at least a portion of the search query on a display of the message identifying server; and
receive selection of at least one of the identified one or more messages matching the at least a portion of the search query for further processing; and
an account searching server, the account searching server including at least a second processor, a second communication interface and a second memory storing computer-executable instructions that, when executed, cause the at least a second processor to:
receive metadata associated with the selected at least one of the identified one or more messages matching the at least a portion of the search query from the message identifying server via the second communication interface;
receive identification of a plurality of user accounts to be searched for occurrences of the selected at least one of the identified one or more messages matching the at least a portion of the search query;
search the identified plurality of user accounts for occurrences of the metadata associated with the selected at least one of the identified one or more messages matching the at least a portion of the search query;
responsive to identifying an occurrence of the metadata associated with the selected at least one of the identified one or more messages matching the at least a portion of the search query, remove the occurrence of the selected at least one of the identified one or more messages matching the at least a portion of the search query from a user account in which the occurrence was identified; and
transmit the occurrence of the selected at least one of the identified one or more messages matching the at least a portion of the search query to a quarantine location.

2. The system of claim 1, wherein receiving a search query includes receiving information identifying a single message.

3. The system of claim 1, wherein receiving the search query includes receiving a file including a plurality of messages identified as potentially malicious.

4. The system of claim 1, wherein receiving the search query includes receiving a customized search query including at least one of: a sender, a recipient, a subject, and a keyword.

5. The system of claim 4, wherein identifying one or more messages matching at least a portion of the search query includes using grouping logic to search, via a log repository, a plurality of received messages to identify the one or more messages matching at least a portion of the search query.

6. The system of claim 1, wherein the plurality of received messages are email messages and the plurality of user accounts are email accounts of a plurality of users.

7. The system of claim 1, wherein the account searching server further includes instructions that, when executed, cause the at least the second processor to:
transmit a status of the occurrence of the selected at least one of the identified one or more messages to the message matching the at least a portion of the search query identifying server; and
display the status on the display of the message identifying server.

8. The system of claim 7, wherein the status includes an indication that the occurrence has been transmitted to the quarantine location and identification from a user account from which the occurrence was removed.

9. The system of claim 1, wherein receiving the search query includes receiving a comma separated value file uploaded to the message identifying server.

10. An apparatus, comprising:
at least one processor;
a communication interface; and
at least one memory storing computer-executable instructions that, when executed, cause the apparatus to:
receive a search query;
search a plurality of received message to identify one or more received messages matching at least a portion of the search query;
display the identified one or more messages matching the at least a portion of the search query on a display of the apparatus;
receive selection of at least one of the identified one or more messages matching the at least a portion of the search query for further processing;
transmit metadata associated with the selected at least one of the identified one or more messages matching the at least a portion of the search query to an account searching server via the communication interface;
receive, from the account searching server and via the communication interface, identified occurrences of the selected at least one of the identified one or more messages matching the at least a portion of the search query found in one or more user accounts based on the metadata; and
receive, from the account searching server and via the communication interface, an indication that the identified occurrences have been removed from the one or more user accounts and have been transmitted to a quarantine location.

11. The apparatus of claim 10, wherein receiving a search query includes receiving information identifying a single message.

12. The apparatus of claim 10, wherein receiving the search query includes receiving a file including a plurality of messages identified as potentially malicious.

13. The apparatus of claim 10, wherein receiving the search query includes receiving a customized search query including at least one of: a sender, a recipient, a subject, and a keyword.

14. The apparatus of claim 13, wherein identifying one or more messages matching at least a portion of the search query includes using grouping logic to search, via a log repository, a plurality of received messages to identify the one or more messages matching at least a portion of the search query.

15. The apparatus of claim 10, wherein the plurality of received messages are email messages.

16. The apparatus of claim 10, further including instructions that, when executed, cause the apparatus to:
 receive, from the account searching server, a status of the occurrence of the selected at least one of the identified one or more messages matching the at least a portion of the search query; and
 display the status on the display of the apparatus.

17. The apparatus of claim 16, wherein the status includes an indication that the occurrence has been transmitted to the quarantine location and identification from a user account from which the occurrence was removed.

18. A method, comprising:
 receiving, by a message identifying server including at least a first processor, a first communication interface and a first memory a search query;
 searching a plurality of received messages to identify, by the message identifying server, one or more messages matching at least a portion of the search query;
 displaying, by the message identifying server, the identified one or more messages matching the at least a portion of the search query on a display;
 receiving, by the message identifying server, selection of at least one of the identified one or more messages matching the at least a portion of the search query for further processing;
 transmitting, by the message identifying server and to an account searching server, metadata associated with the selected at least one of the identified one or more messages matching the at least a portion of the search query;
 searching, by the account searching server, a plurality of user accounts for occurrences of the metadata associated with the selected at least one of the identified one or more messages matching the at least a portion of the search query;
 responsive to identifying an occurrence of the metadata associated with the selected at least one of the identified one or more messages matching the at least a portion of the search query, remove the occurrence of the selected at least one of the identified one or more messages matching the at least a portion of the search query from a user account in which the occurrence was identified; and
 transmit, by the account searching server, the occurrence of the selected at least one of the identified one or more messages matching the at least a portion of the search query to a quarantine location.

19. The method of claim 18, wherein receiving the search query includes receiving a customized search query including at least one of: a sender, a recipient, a subject, and a keyword.

20. The method of claim 19, wherein identifying one or more messages matching at least a portion of the search query includes using grouping logic to search, via a log repository, a plurality of received messages to identify the one or more messages matching at least a portion of the search query.

* * * * *